(12) United States Patent
Owaki

(10) Patent No.: US 11,274,580 B2
(45) Date of Patent: Mar. 15, 2022

(54) OIL STORING STRUCTURE FOR INTERNAL COMBUSTION ENGINE

(71) Applicant: TOYOTA JIDOSHA KABUSHIKI KAISHA, Toyota (JP)

(72) Inventor: Kazuyuki Owaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 16/573,292

(22) Filed: Sep. 17, 2019

(65) Prior Publication Data

US 2020/0149446 A1    May 14, 2020

(30) Foreign Application Priority Data

Nov. 14, 2018    (JP) .............................. JP2018-213816

(51) Int. Cl.
*F01M 11/00*    (2006.01)

(52) U.S. Cl.
CPC ... *F01M 11/0004* (2013.01); *F01M 2011/005* (2013.01); *F01M 2011/007* (2013.01); *F01M 2011/0008* (2013.01)

(58) Field of Classification Search
CPC ....... F01M 11/0004; F01M 2011/0008; F01M 2011/005; F01M 2011/007; F16N 31/002; F16N 31/006
See application file for complete search history.

(56) References Cited

U.S. PATENT DOCUMENTS

| | | | | |
|---|---|---|---|---|
| 2009/0145695 | A1* | 6/2009 | Hiramatsu | F01M 11/0004 184/106 |
| 2010/0065014 | A1* | 3/2010 | Dos Santos | F01M 11/0004 123/196 R |
| 2012/0190255 | A1* | 7/2012 | Yamazaki | B63H 21/386 440/88 L |
| 2012/0204828 | A1* | 8/2012 | Koseki | F01M 11/0004 123/195 C |

FOREIGN PATENT DOCUMENTS

| | | |
|---|---|---|
| DE | 10 2006 019 676 A1 | 10/2009 |
| JP | 1-104907 A | 4/1989 |
| JP | 2010-19098 A | 1/2010 |
| JP | 2012-117480 A | 6/2012 |

\* cited by examiner

*Primary Examiner* — Syed O Hasan
(74) *Attorney, Agent, or Firm* — Oblon, McClelland, Maier & Neustadt, L.L.P.

(57) ABSTRACT

An internal combustion engine includes a bottomed box-shaped oil pan in which oil is stored. In addition, the internal combustion engine includes an oil pump configured to suck the oil in the oil pan and pressure-feed the oil to each part of the internal combustion engine. A suction pipe extends toward a bottom surface of the oil pan from the oil pump. A strainer is attached to a tip end of the suction pipe. A projection portion protrudes from a bottom surface which is one of inner wall surfaces defining an oil storing space inside the oil pan. The resonance frequency of the projection portion falls in the range of frequency of vibration that is generated at an engine rotational speed at which the internal combustion engine continues to operate independently.

6 Claims, 1 Drawing Sheet

OIL STORING STRUCTURE FOR INTERNAL COMBUSTION ENGINE

INCORPORATION BY REFERENCE

The disclosure of Japanese Patent Application No. 2018-213816 filed on Nov. 14, 2018 including the specification, drawings and abstract is incorporated herein by reference in its entirety.

BACKGROUND

1. Technical Field

The present disclosure relates to an oil storing structure for an internal combustion engine.

2. Description of Related Art

In the case of an internal combustion engine in Japanese Unexamined Patent Application Publication No. 2012-117480 (JP 2012-117480 A), a bottomed box-shaped oil pan in which oil is stored is attached to a lower side of a cylinder block in which cylinders are defined. In addition, the internal combustion engine is provided with an oil pump for pressure-feeding oil stored in the oil pan to each part of the internal combustion engine. A suction pipe extends toward a bottom surface of the oil pan from the oil pump and a strainer for removing foreign substances contained in oil is attached to a tip end of the suction pipe.

SUMMARY

In the case of the internal combustion engine in JP 2012-117480 A, when oil flowing downwardly to the oil pan is stirred by a crankshaft or when oil flowing downwardly to the oil pan is scattered after colliding with the crankshaft, air bubbles may be generated on the surface of the oil or be generated in the oil. When such air bubbles remain without collapsing, there is a possibility that the air bubbles are sucked into the strainer such that the oil is not appropriately discharged from the oil pump.

An aspect of the present disclosure relates to an oil storing structure for an internal combustion engine. The oil storing structure includes a bottomed box-shaped oil pan in which oil is stored, an oil pump configured to suck the oil in the oil pan and pressure-feed the oil to each part of the internal combustion engine, a suction pipe extending toward a bottom surface of the oil pan from the oil pump, and a strainer attached to a tip end of the suction pipe. A projection portion protrudes from an inner wall surface defining an oil storing space inside the oil pan. The resonance frequency of the projection portion falls in the range of frequency of vibration that is generated at an engine rotational speed at which the internal combustion engine continues to operate independently.

In the case of the above-described configuration, the projection portion vibrates when the internal combustion engine is driven and the frequency of vibration that is generated at the engine rotational speed of the internal combustion engine becomes similar to the resonance frequency of the projection portion. When the projection portion vibrates, the surface of the oil in the oil pan vibrates and air bubbles present on the surface of the oil collapse due to the impact of the vibration. Accordingly, it is possible to suppress a large amount of air bubbles remaining on the surface of the oil in the oil pan.

In the oil storing structure according to the aspect of the present disclosure, the projection portion may protrude from the bottom surface of the oil pan. In the case of the above-described configuration, even when the amount of the oil stored in the oil pan decreases and the position of the surface of the oil is lowered, at least a portion of the projection portion is in the oil. Accordingly, the vibration of the projection portion can be transmitted to the oil regardless of the position of the surface of the oil.

In the oil storing structure according to the aspect of the present disclosure, the projection portion may extend to surround the strainer. In the case of the above-described configuration, even if the oil in the oil pan is about to be concentrated on one side in the oil pan when the vehicle accelerates or decelerates or when the vehicle turns, the oil is temporarily stored inside the projection portion, that is, in the vicinity of the strainer. Therefore, even when the oil is about to be concentrated on the one side in the oil pan, it is possible to suppress air being sucked through the strainer.

In the oil storing structure according to the aspect of the present disclosure, the resonance frequency of the projection portion may fall in a range of 10 to 20 kHz. Generally, in the internal combustion engine, the amount of oil pressure-fed to each part of the internal combustion engine from the oil pump increases as the engine rotational speed of the internal combustion engine increases. When the amount of oil pressure-fed to each part of the internal combustion engine from the oil pump increases in this manner, the amount of oil stored in the oil pan decreases. If the position of the surface of the oil in the oil pan is lowered, air bubbles on the surface of oil are likely to be sucked through the strainer.

In the above-described configuration, the resonance frequency of the projection portion is set in accordance with the frequency of vibration of the internal combustion engine that is generated when the engine rotational speed of the internal combustion engine is relatively high. Therefore, it is possible to efficiently break the air bubbles on the surface of the oil by means of the vibration of the projection portion in a situation where the amount of oil stored in the oil pan may decrease.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an oil storing structure for an internal combustion engine 100 of a vehicle will be described with reference to FIGS. 1 and 2. First, a configuration of the internal combustion engine 100 will be described schematically. Note that, the following description will be made on an assumption that the internal combustion engine 100 is installed in the vehicle and the height direction of the vehicle is parallel to the height direction of the internal combustion engine 100.

Figure 1:
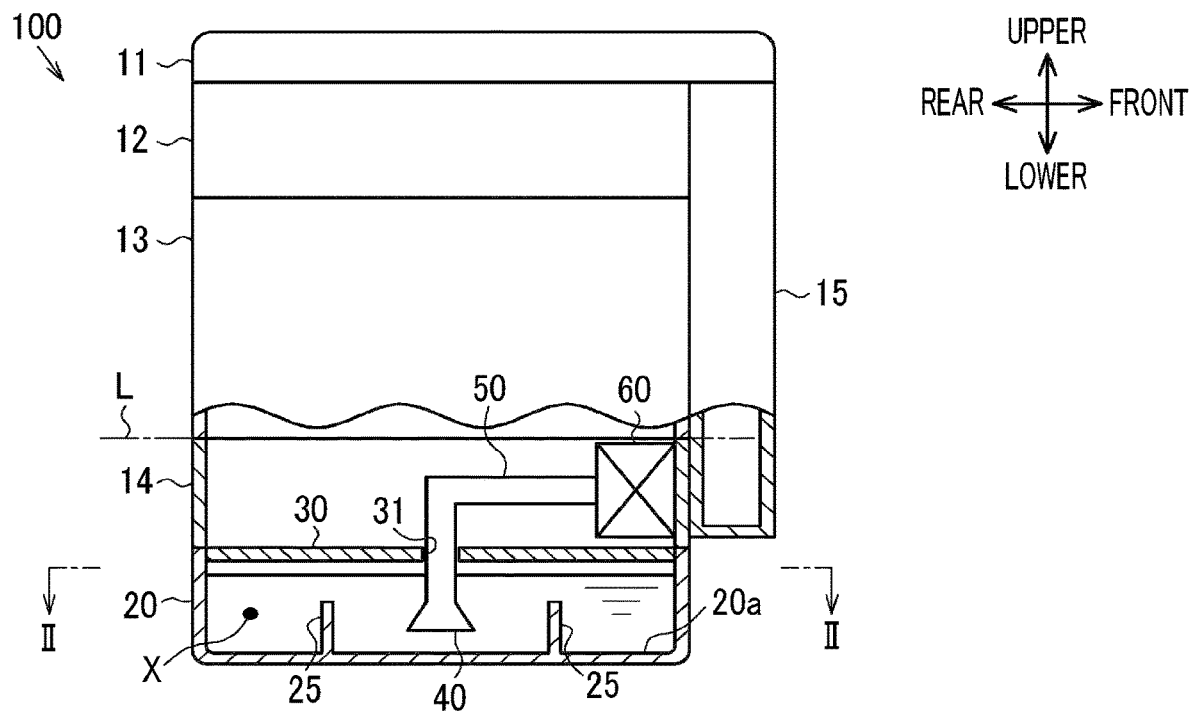
FIG. 1 is a partial sectional view of an internal combustion engine.

As shown in FIG. 1, the internal combustion engine 100 is provided with a cylinder block 13 that has a square pole shape as a whole. In the cylinder block 13, a plurality of cylinders (not shown) is defined. The cylinders are arranged in an axial direction L (lateral direction in FIG. 1) of a crankshaft. Note that, the following description will be made on an assumption that one side (right side in FIG. 1) in the axial direction L of the crankshaft is a front side of the internal combustion engine 100 and the other side (left side in FIG. 1) in the axial direction L of the crankshaft is a rear side of the internal combustion engine 100.

A cylinder head 12 that has a square pole shape as a whole is fixed to an upper surface of the cylinder block 13. In the cylinder head 12, a plurality of intake ports (not shown) and a plurality of exhaust ports (not shown) are defined. In addition, an intake valve that opens and closes the intake ports and an exhaust valve that opens and closes the exhaust ports are attached to the cylinder head 12.

A head cover 11 that covers an upper surface of the cylinder head 12 is fixed to the upper surface of the cylinder head 12. A valve gear (not shown) for opening and closing the intake valve and the exhaust valve is accommodated in a space defined by the head cover 11 and the cylinder head 12.

A crankcase 14 that has a square pole shape as a whole is fixed to a lower surface of the cylinder block 13. The crankshaft (not shown) is supported between the crankcase 14 and the cylinder block 13. In addition, a chain case 15 is fixed to front (left in FIG. 1) outer surfaces of the cylinder head 12, the cylinder block 13, and the crankcase 14. The chain case 15 extends from an upper end of the cylinder head 12 to the vicinity of a lower end of the crankcase 14 in a vertical direction. An upper side of the chain case 15 is covered by the head cover 11. Although not shown, in the chain case 15, a plurality of sprockets for transmitting a rotation force of the crankshaft and chains wound on the sprockets are accommodated.

An oil pan 20 that has a bottomed square box shape as a whole is fixed to a lower surface of the crankcase 14. In the oil pan 20, oil to be supplied to each part of the internal combustion engine 100 is stored. In addition, in the oil pan 20, an approximately square plate-shaped baffle plate 30 is disposed. The baffle plate 30 is disposed while being separated from a bottom surface 20a of the oil pan 20 such that the baffle plate 30 faces the bottom surface 20a of the oil pan 20. An oil storing space X for storing oil is defined by an inner surface of the oil pan 20 and a lower surface of the baffle plate 30. In addition, an insertion hole 31 penetrates an approximately central portion of the baffle plate 30 in a thickness direction of the baffle plate 30.

In the crankcase 14, an oil pump 60 for pressure-feeding oil to each part of the internal combustion engine 100 is disposed. The oil pump 60 is fixed to an inner surface of a front side wall, which is one of four side walls of the crankcase 14. Although not shown, a drive shaft of the oil pump 60 is drive-coupled to the crankshaft via the chains in the chain case 15.

A suction pipe 50 extends toward the bottom surface 20a of the oil pan 20 from the oil pump 60. Specifically, the suction pipe 50 is inserted into the insertion hole 31 of the baffle plate 30 and reaches the oil storing space X. A tip end of the suction pipe 50 is positioned at an approximately central position in the oil pan 20 as seen in a plan view of the oil pan 20.

A strainer 40 for removing foreign substances contained in oil is attached to the tip end of the suction pipe 50. A lower end of the strainer 40 is separated from the bottom surface 20a of the oil pan 20. As described above, the tip end of the suction pipe 50 is positioned at the approximately central position in the oil pan 20 as seen in a plan view of the oil pan 20. Therefore, the strainer 40 is positioned at the approximately central position in the oil pan 20. When the oil pump 60 is driven, the oil stored in the oil pan 20 is sucked through the strainer 40. Then, the oil sucked through the strainer 40 is pressure-fed to each part of the internal combustion engine 100 via the suction pipe 50 and the oil pump 60.

Square plate-shaped projection portions 25 protrude from the bottom surface 20a of the oil pan 20, the bottom surface 20a being one of inner wall surfaces defining the oil storing space X. In the present embodiment, the projection portions 25 protrude in a direction orthogonal to the bottom surface 20a of the oil pan 20. In other words, the projection portions 25 protrude in the vertical direction. Projection tip ends (upper end) of the projection portions 25 are positioned above the lower end of the strainer 40.

Figure 2:
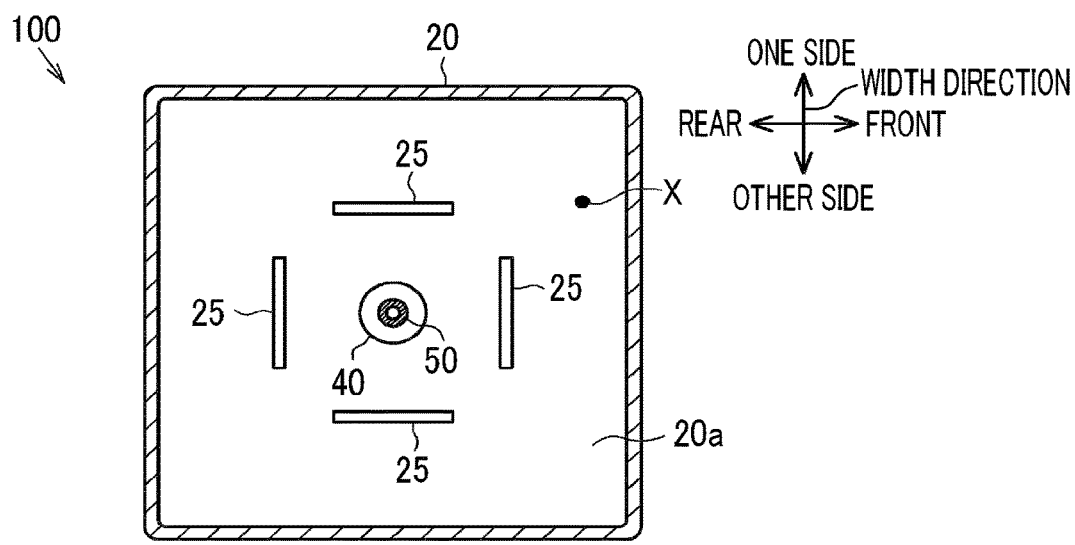
FIG. 2 is a sectional view taken along line II-II in FIG. 1.

As shown in FIG. 2, one projection portion 25 is provided ahead of the strainer 40 in a front-rear direction and one projection portion 25 is provided behind the strainer 40 in the front-rear direction. In addition, one projection portion 25 is provided closer to one side in a width direction than the strainer 40 and one projection portion 25 is provided closer to the other side in the width direction than the strainer 40, the width direction being a direction orthogonal to both of the vertical direction and the front-rear direction. In addition, the four projection portions 25 extend in a square shape surrounding the strainer 40, as a whole. Adjacent projection portions 25 are disposed to be separated from each other. That is, no projection portion 25 is formed on positions corresponding to the four corners of the square shape that is formed by the four projection portions 25 extending in the square shape surrounding the strainer 40.

The resonance frequency of the projection portions 25 falls in the range of frequency of vibration that is generated at an engine rotational speed at which the internal combustion engine 100 can continue to operate independently. Here, the lower limit value of the engine rotational speed at which the internal combustion engine 100 can continue to operate independently is an engine rotational speed at the time of a state where a driver of the vehicle does not operate an accelerator pedal (idle operation state) and is from several hundred rpm to one thousand and several hundred rpm, for example. In addition, the upper limit value of the engine rotational speed at which the internal combustion engine 100 can continue to operate independently is an engine rotational speed at the time of a state where the driver of the vehicle fully steps on the accelerator pedal (full throttle state) and is several thousand rpm, for example.

In the present embodiment, the resonance frequency of the projection portions 25 is the same as the frequency of vibration that is generated when the engine rotational speed of the internal combustion engine 100 is 5500 rpm and the resonance frequency of the projection portions 25 falls in a range of 10 to 20 kHz. Here, the above-described engine rotational speed (5500 rpm) is set to an engine rotational speed that can be reached when the vehicle is suddenly accelerated. In other words, the above-described engine rotational speed (5500 rpm) is set to an engine rotational speed that can be reached when the driver of the vehicle operates the accelerator pedal even if the vehicle is not under extremely unusual traveling conditions. In addition, the resonance frequency (10 to 20 kHz) of the projection portions 25 is set to the frequency of vibration that is generated in the oil pan 20 when the engine rotational speed is 5500 rpm and is obtained in advance by means of a test, a simulation, or the like.

The operation and effect of the present embodiment will be described. Air bubbles may be generated on the surface of the oil or may be generated in the oil in the oil pan 20.

When such air bubbles remain without collapsing, there is a possibility that the air bubbles are sucked into the strainer 40 and the air bubbles are supplied into the oil pump 60. If the air bubbles are supplied into the oil pump 60, there is a possibility that an appropriate discharge pressure in the oil pump 60 cannot be obtained or hydraulic equipment that is operated by means of oil from the oil pump 60 does not operate as expected.

In the present embodiment, the projection portions 25 protrude from an inner wall surface of the oil storing space X. In addition, the resonance frequency of the projection portions 25 falls in the range of frequency of vibration that is generated at an engine rotational speed at which the internal combustion engine 100 can continue to operate independently. Therefore, when the internal combustion engine 100 is driven and the engine rotational speed of the internal combustion engine 100 reaches a predetermined engine rotational speed (5500 rpm), the frequency of vibration that is generated at that engine rotational speed coincides with the resonance frequency of the projection portions 25. As a result, the projection portions 25 vibrate in the oil in the oil pan 20. When the projection portions 25 vibrate as described above, the surface of the oil in the oil pan 20 vibrates and air bubbles present on the surface of the oil collapse due to the impact of the vibration. Accordingly, the number of air bubbles generated on the surface of the oil is decreased and thus it is possible to suppress a large amount of air bubbles remaining on the surface of the oil in the oil pan 20.

Here, as the engine rotational speed of the internal combustion engine 100 increases, the amount of oil pressure-fed to each part of the internal combustion engine 100 from the oil pump 60 increases, the oil pump 60 being driven when the crankshaft is rotated. When the amount of oil pressure-fed to each part of the internal combustion engine 100 from the oil pump 60 increases in this manner, the amount of oil stored in the oil pan 20 decreases. As a result, the position of the surface of the oil in the oil pan 20 is lowered. If the height of the surface of the oil becomes similar to the height of the lower end of the strainer 40, air bubbles generated on the surface of oil are likely to be sucked into the strainer 40.

In the present embodiment, the projection portions 25 protrude from the bottom surface 20a of the oil pan 20. Therefore, even when the amount of the oil stored in the oil pan 20 decreases and the position of the surface of the oil is lowered, at least a portion of a base end side of each projection portion 25 is in the oil. Accordingly, the vibration of the projection portions 25 can be transmitted to the oil regardless of the position of the surface of the oil.

In addition, the resonance frequency of the projection portions 25 is set in accordance with the frequency of vibration that is generated when the engine rotational speed of the internal combustion engine 100 is 5500 rpm. In addition, as described above, when the engine rotational speed is 5500 rpm, the load on the internal combustion engine 100 is large and thus the position of the surface of the oil in the oil pan 20 is likely to be lowered. That is, in the present embodiment, the projection portions 25 vibrate in a situation where the position of the surface of the oil in the oil pan 20 is likely to be lowered and the air bubbles are likely to be sucked into the strainer 40. Therefore, it is possible to break the air bubbles by means of the vibration of the projection portions 25 in a situation where an adverse effect due to the presence of the air bubbles is likely to be generated. Meanwhile, for example, when the internal combustion engine 100 is in the idle operation state, the projection portions 25 are not likely to vibrate and thus the driver is not likely to notice a sound generated due to vibration of the projection portions 25 as a strange noise.

Incidentally, for example, when the vehicle accelerates or decelerates or when the vehicle turns, the oil in the oil pan 20 may move such that the oil is concentrated on one side of the oil pan 20. If there is no projection portion 25, the amount of oil in the vicinity of the strainer 40 may become temporarily small when the oil in the oil pan 20 is concentrated on the one side of the oil pan 20. In this case, there is a possibility that a large amount of air is sucked through the strainer 40.

In the present embodiment, the four projection portions 25 are disposed to surround the strainer 40. Therefore, even when the oil in the oil pan 20 is about to be concentrated on the one side of the oil pan 20, the projection portions 25 inhibit the oil from flowing to be concentrated on the one side. Accordingly, the oil is temporarily stored in the vicinity of the strainer 40. As described above, even when the oil in the oil pan 20 is about to be concentrated on one side in the oil pan 20, a certain amount of oil can be stored in the vicinity of the strainer 40 and thus it is possible to suppress air being sucked through the strainer 40.

The present embodiment can be modified as follows. The present embodiment and the following modification examples can be implemented by being combined with each other as far as a technological inconsistency is not generated.
• In the above-described embodiment, positions where the projection portions protrude can be changed. For example, the projection portions may protrude from a side surface of the oil pan 20. In addition, for example, the projection portions may protrude from the lower surface of the baffle plate 30 which is one of the inner wall surfaces defining the oil storing space X. In those cases as well, if at least a portion of each projection portion is in the oil, vibration of the projection portions is transmitted to the oil. Note that, it is preferable that at least a portion of each projection portion is in the oil in a situation where a regulated amount of oil is stored in the oil pan 20.

In the above-described embodiment, the number of projection portions can be changed. For example, the number of projection portions may be three or less or five or more.

In the above-described embodiment, the shape of each projection portion can be changed. For example, each projection portion may have a rod-like shape. In addition, for example, one projection portion may extend to surround the strainer 40.

In the above-described embodiment, a positional relationship between the projection portions and the strainer can be changed. For example, the projection portions do not need to surround the strainer 40 if the amount of oil in the oil pan 20 is large and the influence of oil concentration on one side in the oil pan 20 is small.

In the above-described embodiment, the resonance frequency of the projection portions can be changed. For example, the frequency of vibration generated in the oil pan 20 may change depending on the structure, material, or the like of the internal combustion engine 100 even when the engine rotational speed stays the same. Therefore, the resonance frequency of the projection portions may be changed in accordance with the structure, material, or the like of the internal combustion engine 100.

In addition, an engine rotational speed at which the internal combustion engine enters a high-load state depends on the structure, material, or the like of the internal combustion engine 100. In addition, when the resonance frequency of the projection portions 25 is designed in accordance with an engine rotational speed in an excessively-high-load state, the projection portions 25 become less likely to vibrate. Therefore, it is preferable that the resonance frequency of the projection portions 25 is designed in accordance with an engine rotational speed at which the internal combustion engine 100 enters a high-load state and which is reached at a certain frequency. Note that, in the case of a passenger car commercially available at the time of filing of the present application, an engine rotational speed satisfying the above-described conditions is approximately 4000 rpm to 7000 rpm. In addition, the vibration of the oil pan 20 that is generated at the engine rotational speed as described above is 10 to 20 Hz.

In the above-described embodiment, an electrified oil pump may be adopted as the oil pump instead of the oil pump 60 which uses rotation of the crankshaft as a drive source. Even in the case of the electrified oil pump, generally, the amount of oil pressure-fed to each part of the internal combustion engine 100 from the oil pump increases as the engine rotational speed of the internal combustion engine 100 increases. Therefore, even in the case of the electrified oil pump, application of technical ideas of the above-described embodiment is effective.

What is claimed is:

1. An oil storing structure for an internal combustion engine, the oil storing structure comprising:
   a bottomed box-shaped oil pan in which oil is stored;
   an oil pump configured to suck the oil in the oil pan and pressure-feed the oil to each part of the internal combustion engine;
   a suction pipe extending toward a bottom surface of the oil pan from the oil pump; and
   a strainer attached to a tip end of the suction pipe, wherein:
   a projection portion protrudes from an inner wall surface defining an oil storing space inside the oil pan; and
   a resonance frequency of the projection portion falls in a range of frequency of vibration that is generated at a predetermined engine rotational speed,
   wherein the projection portion is configured to vibrate at the resonance frequency to collapse bubbles in the oil.

2. The oil storing structure according to claim 1, wherein the projection portion protrudes from the bottom surface of the oil pan.

3. The oil storing structure according to claim 2, wherein the projection portion extends to surround the strainer.

4. The oil storing structure according to claim 1, wherein the resonance frequency of the projection portion falls in a range of 10 to 20 kHz.

5. The oil storing structure according to claim 1, wherein the projection portion is one of a plurality of separately provided projection portions that surround the strainer.

6. The oil storing structure according to claim 1, wherein the predetermined engine rotational speed is 5500 RPM.

* * * * *